(12) United States Patent
Takasugi et al.

(10) Patent No.: US 11,465,490 B2
(45) Date of Patent: Oct. 11, 2022

(54) COOLING STRUCTURE OF VEHICLE

(71) Applicant: HONDA MOTOR CO., LTD., Tokyo (JP)

(72) Inventors: Shoji Takasugi, Wako (JP); Kota Yoshiura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 296 days.

(21) Appl. No.: 16/908,775

(22) Filed: Jun. 23, 2020

(65) Prior Publication Data

US 2020/0406740 A1 Dec. 31, 2020

(30) Foreign Application Priority Data

Jun. 28, 2019 (JP) .............................. JP2019-121740

(51) Int. Cl.
*B60K 11/02* (2006.01)
*F16H 57/04* (2010.01)
(Continued)

(52) U.S. Cl.
CPC ............... *B60K 11/02* (2013.01); *B60K 6/24* (2013.01); *B60K 6/26* (2013.01); *B60K 6/36* (2013.01); *F16H 57/0424* (2013.01); *H02K 9/19* (2013.01)

(58) Field of Classification Search
CPC . B60K 11/02; B60K 6/24; B60K 6/26; B60K 6/36; F16H 57/0424; H02K 9/19
See application file for complete search history.

(56) References Cited

U.S. PATENT DOCUMENTS

| 2005/0204861 A1* | 9/2005 | Reed ...................... B60K 6/445 |
| | | 74/606 R |
| 2013/0283972 A1* | 10/2013 | Yamamoto ............ F16H 37/065 |
| | | 903/902 |

(Continued)

FOREIGN PATENT DOCUMENTS

| JP | 2016-146740 | 8/2016 |
| JP | 2018-170825 | 11/2018 |
| JP | 2019-103245 | 6/2019 |

OTHER PUBLICATIONS

Japanese Notice of Allowance for Japanese Patent Application No. 2019-121740 dated Feb. 16, 2021.

*Primary Examiner* — Colby M Hansen
(74) *Attorney, Agent, or Firm* — Amin, Turocy & Watson, LLP

(57) ABSTRACT

Provided is a cooling structure of a vehicle, which suppresses air stagnation in the motor when manufacturing, and improves productivity, while maintaining cooling efficiency of a motor. A cooling structure of a vehicle is equipped with a first cooling circuit (41) configured to cool an engine; and a second cooling circuit (42) configured to cool a motor (3) and an electric device including an inverter which connects the motor (3) and a power storage device, in which the first cooling circuit (41) has a first motor internal flow path (20) provided in a motor case (12), the second cooling circuit (42) has a second motor internal flow path (30) provided in the motor case (12), the second motor internal flow path (30) has a circumferential flow path (33) configured to allow a refrigerant (S) to flow along a circumferential direction of the motor (3), an inlet pipe (34) configured to allow the refrigerant (S) to flow into the circumferential flow path (33), and an outlet pipe (35) configured to discharge the refrigerant (S) from the circumferential flow path (33), and (Continued)

the inlet pipe (34) is disposed to be closer to the first motor internal flow path (20) side than the outlet pipe (35).

4 Claims, 4 Drawing Sheets

(51) Int. Cl.
  *B60K 6/36* (2007.10)
  *B60K 6/24* (2007.10)
  *B60K 6/26* (2007.10)
  *H02K 9/19* (2006.01)

(56) References Cited

U.S. PATENT DOCUMENTS

2017/0204962 A1* 7/2017 Brownell .............. F16H 57/046
2019/0128179 A1* 5/2019 Kiyokami ................ B60K 6/40

* cited by examiner

COOLING STRUCTURE OF VEHICLE

CROSS-REFERENCE TO RELATED APPLICATION

Priority is claimed on Japanese Patent Application No. 2019-121740, filed Jun. 28, 2019, the content of which is incorporated herein by reference.

BACKGROUND OF THE INVENTION

Field of the Invention

The present invention relates to a cooling structure of a vehicle.

Description of Related Art

In the related art, a configuration having a two-system cooling circuit is known as a configuration of a motor having a cooling circuit.

For example, Patent Document 1 (Japanese Unexamined Patent Application, First Publication No. 2016-146740) discloses a configuration of an electric motor which has a frame which defines an internal volume for accommodating a rotor and a stator, one primary cooling circuit of which a fluid communicates with outside of the frame, a cooling device provided outside the frame, and at least one secondary cooling circuit which is separate from the primary circuit, traverses the rotor and is in fluid communication with the cooling device. According to the technique described in Patent Document 1, the stator of the electric motor can be efficiently cooled by the primary cooling circuit. Since the secondary cooling circuit traverses channels of the primary cooling circuit that supplies the stator with a gas fluid from the outside of the frame, by providing a heat exchange region between the outside air and the gas fluid circulating in the secondary cooling circuit, it is possible to improve the cooling due to the secondary cooling circuit.

Incidentally, in some cases, a hybrid vehicle equipped with, for example, a motor and an engine may be equipped with a two-system cooling circuit including a first cooling circuit which cools the engine, and a second cooling circuit which cools the motor and has a temperature lower than that of the first cooling circuit. With such a configuration of the cooling circuit, the cooling efficiency of the motor can be improved as compared with a case in which the engine and the motor are cooled by a single cooling circuit.

However, when circulating through a relatively low-temperature second cooling in a motor, the viscosity of the refrigerant circulating in the motor is high and the flow velocity is likely to decrease. For this reason, it is difficult to discharge trapped air generated when a refrigerant is put into a cooling circuit in a motor when manufacturing thereof. Therefore, there is room for improvement in terms of inhibiting trapped air when manufacturing and improving productivity.

An object of the present invention is to provide a cooling structure of a vehicle that suppresses the air stagnation in the motor when manufacturing and improves productivity, while maintaining the air cooling efficiency of the motor.

SUMMARY OF THE INVENTION

A cooling structure of a vehicle according to the present invention employ the following configurations.

(1) A cooling structure of a vehicle according to an aspect of the present invention (for example, a cooling structure 6 in the embodiment) is equipped with a first cooling circuit (for example, a first cooling circuit 41 in the embodiment) configured to cool an engine (for example, an engine 2 in the embodiment); and a second cooling circuit (for example, a second cooling circuit 42 in the embodiment) configured to cool a motor (for example, a motor 3 in the embodiment) and an electric device (for example, an electric device 5 in the embodiment) including an inverter which connects the motor to a power storage device, in which the first cooling circuit has a first motor internal flow path (for example, a first motor internal flow path 20 in the embodiment) provided in a casing of the motor (for example, a motor case 12 in the embodiment), the second cooling circuit has a second motor internal flow path (for example, a second motor internal flow path 30 in the embodiment) provided in the casing, the second motor internal flow path has a circumferential flow path (for example, a circumferential flow path 33 in the embodiment) configured to allow a refrigerant (for example, a refrigerant S in the embodiment) to flow along a circumferential direction of the motor, an inlet pipe (for example, an inlet pipe 34 in the embodiment) configured to allow the refrigerant to flow into the circumferential flow path, and an outlet pipe (for example, an outlet pipe 35 in the embodiment) configured to discharge the refrigerant from the circumferential flow path, and the inlet pipe is disposed on the first motor internal flow path side of the outlet pipe.

(2) A cooling structure of a vehicle according to an aspect of the present invention is equipped with a first cooling circuit (for example, a first cooling circuit 41 in the embodiment) configured to cool an engine (for example, an engine 2 in the embodiment); and a second cooling circuit (for example, a second cooling circuit 42 in the embodiment) configured to cool a motor (for example, a motor 3 in the embodiment) and an electric device (for example, an electric device 5 in the embodiment) including an inverter which connects the motor and a power storage device, in which the first cooling circuit has a first motor internal flow path (for example, a first motor internal flow path 20 in the embodiment) provided in a casing of the motor, the second cooling circuit has a second motor internal flow path (for example, a second motor internal flow path 30 in the embodiment) provided in the casing, the second motor internal flow path has a circumferential flow path (for example, a circumferential flow path 33 in the embodiment) configured to allow a refrigerant (for example, a refrigerant S in the embodiment) to flow along a circumferential direction of the motor, an inlet part (for example, a second inlet part 31 in the embodiment) configured to allow the refrigerant to flow into the casing, and an outlet part (for example, a second outlet part 32 in the embodiment) configured to discharge the refrigerant from inside of the casing, and the inlet part may be disposed to be closer to the first motor internal flow path side than the outlet part.

(3) In the aspect of the above-mentioned (1) or (2), the second motor internal flow path may have an outlet pipe configured to discharge the refrigerant from the circumferential flow path to the outside of the casing, and the outlet pipe may be provided above the circumferential flow path.

(4) In the aspect of any one of the above-mentioned (1) to (3), the vehicle may have a power transmission unit (for example, a power transmission unit 4 in the embodiment), the first cooling circuit may cool the power transmission unit, and the casing of the motor may be provided between the engine and the power transmission unit.

According to the configuration of (1), the first cooling circuit cools the engine, and the second cooling circuit cools the electric device and the motor. The motor can be cooled by the second cooling circuit which is different from the first cooling circuit for the engine which easily reaches a high temperature. Therefore, it is possible to more efficiently cool the motor than in a case in which the engine and the motor are cooled by a single cooling circuit.

The inlet pipe of the second cooling circuit is disposed on the first motor internal flow path side of the first cooling circuit. As a result, heat exchange is performed between the inlet pipe of the second cooling circuit and the first motor internal flow path of the first cooling circuit, and it is possible to increase the temperature of the refrigerant flowing into the circumferential flow path of the second cooling circuit. Here, for example, when the refrigerant is injected into the second motor internal flow path when manufacturing, air bubbles in the circumferential flow path of the second cooling circuit may remain as an air stagnation. With respect to this problem, according to the cooling structure of the vehicle of the present invention, the temperature of the refrigerant flowing through the inlet pipe of the second cooling circuit increases due to the heat from the first motor internal flow path of the first cooling circuit, and thus the viscosity decreases. As a result, it is possible to increase the flow velocity of the refrigerant flowing into the circumferential flow path of the second cooling circuit. Therefore, trapped air can be quickly discharged outside of the motor, without any air bubbles remaining therein.

Therefore, it is possible to provide the cooling structure of the vehicle that suppresses the air stagnation in the motor when manufacturing and improves the productivity, while maintaining the cooling efficiency of the motor.

According to the configuration of (2), the first cooling circuit cools the engine, and the second cooling circuit cools the electric device and the motor. The motor can be cooled by the second cooling circuit which is different from the first cooling circuit for the engine which easily reaches a high temperature. Therefore, it is possible to more efficiently cool the motor than in a case in which the engine and the motor are cooled by a single cooling circuit.

The inlet part of the second cooling circuit is disposed on the first motor internal flow path side of the first cooling circuit. As a result, a heat exchange is performed between the inlet part of the second cooling circuit and the first motor internal flow path of the first cooling circuit, and it is possible to increase the temperature of the refrigerant flowing into the circumferential flow path of the second cooling circuit. As a result, since the viscosity of the refrigerant decreases and the flow velocity of the refrigerant flowing into the circumferential flow path of the second cooling circuit increases, the air stagnation can be quickly discharged to the outside of the motor, without staying of air bubbles generated when manufacturing. In particular, when the flow path from the inlet part of the second cooling circuit to the circumferential flow path is also disposed on the first motor internal flow path side of the first cooling circuit, the flow velocity of the refrigerant can be further increased, and the air stagnation can be effectively discharged. Since the temperature of the refrigerant received at the inlet part of the second cooling circuit is lower than the temperature of the refrigerant in the first cooling circuit, the cooling efficiency of the motor does not significantly decrease. Therefore, the temperature can be increased within a range that does not affect the cooling efficiency of the motor and the air stagnation can be discharged.

Therefore, it is possible to provide a cooling structure of the vehicle that suppresses the air stagnation in the motor when manufacturing and improves productivity, while maintaining the cooling efficiency of the motor.

According to the configuration of (3), the outlet pipe of the second motor internal flow path is provided above the circumferential flow path. For this reason, the air bubbles that have risen due to buoyancy in the circumferential flow path can be easily guided to the outlet pipe. Therefore, the air stagnation in the motor can be efficiently discharged.

According to the configuration of (4), the first cooling circuit cools the engine and the power transmission unit. Therefore, a plurality of components can be cooled by the single first cooling circuit. The casing of the motor has a two-system cooling circuit including a first motor internal flow path and a second motor internal flow path. Therefore, even when the motor is provided between the engine and the power transmission unit, the first cooling circuit can bridge between the engine and the power transmission unit through the first motor internal flow path. Therefore, the engine and the power transmission unit can be efficiently cooled.

DETAILED DESCRIPTION OF THE INVENTION

Hereinafter, an embodiment of the present invention will be described with reference to the drawings.

[Vehicle]

Figure 1:
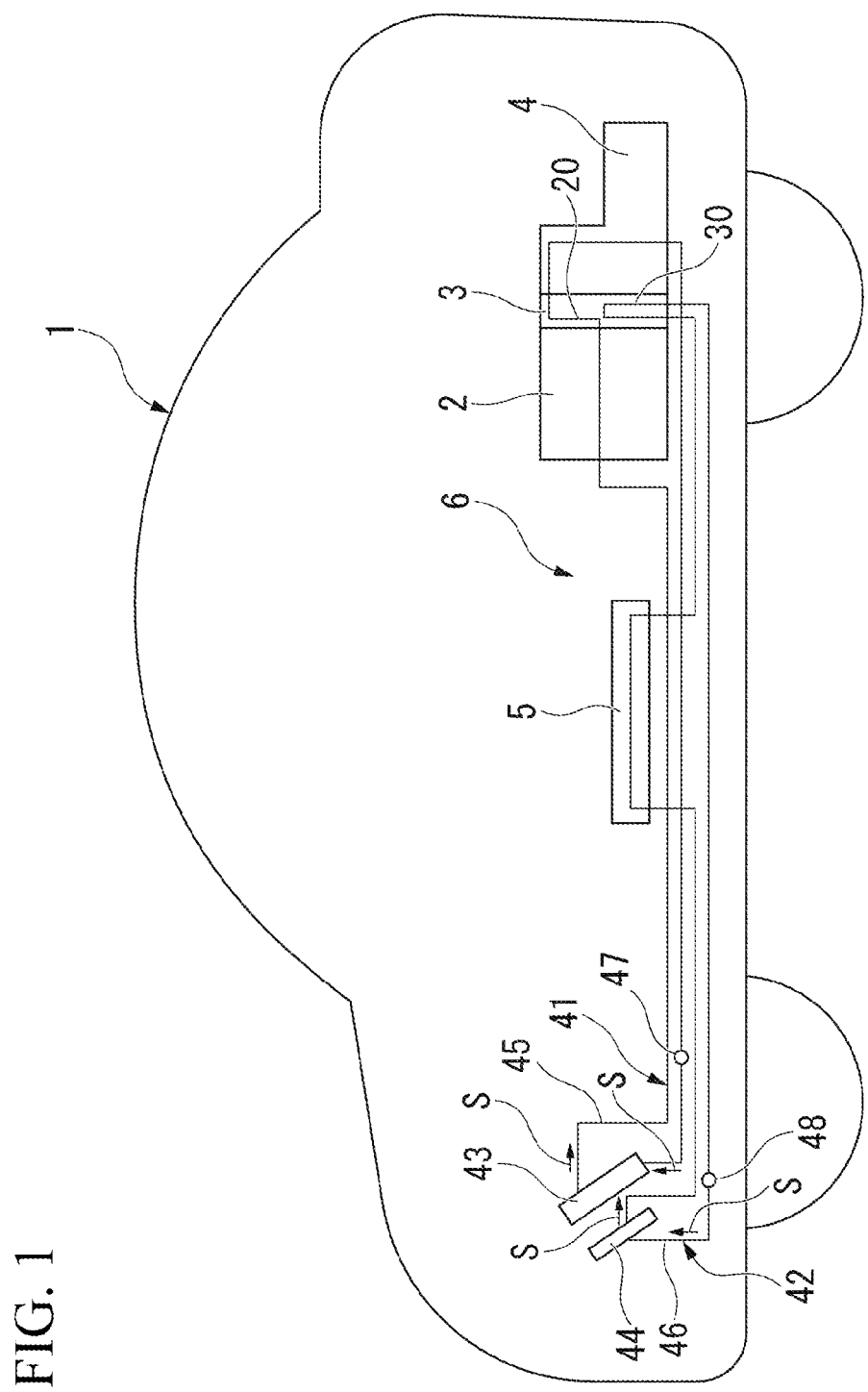
FIG. 1 is a side view showing an outline of a cooling structure of the vehicle according to an embodiment.

FIG. 1 is a side view showing an outline of a cooling structure 6 of a vehicle 1 according to the embodiment.

The cooling structure 6 of the vehicle 1 (hereinafter, simply referred to as the cooling structure 6) is, for example, a structure that is mounted on the vehicle 1 such as a hybrid vehicle to cool each component mounted on the vehicle 1. In the following description, a front-rear direction, a vertical direction, and a left-right direction correspond to a front-rear direction, a vertical direction, and a left-right direction in the vehicle 1 unless otherwise specified.

The vehicle 1 is equipped with an engine 2, a motor 3, a power transmission unit 4, an electric device 5, and a cooling structure 6.

The engine 2 is a so-called water-cooled internal combustion engine. The engine 2 is disposed behind a passenger compartment.

Figure 2:
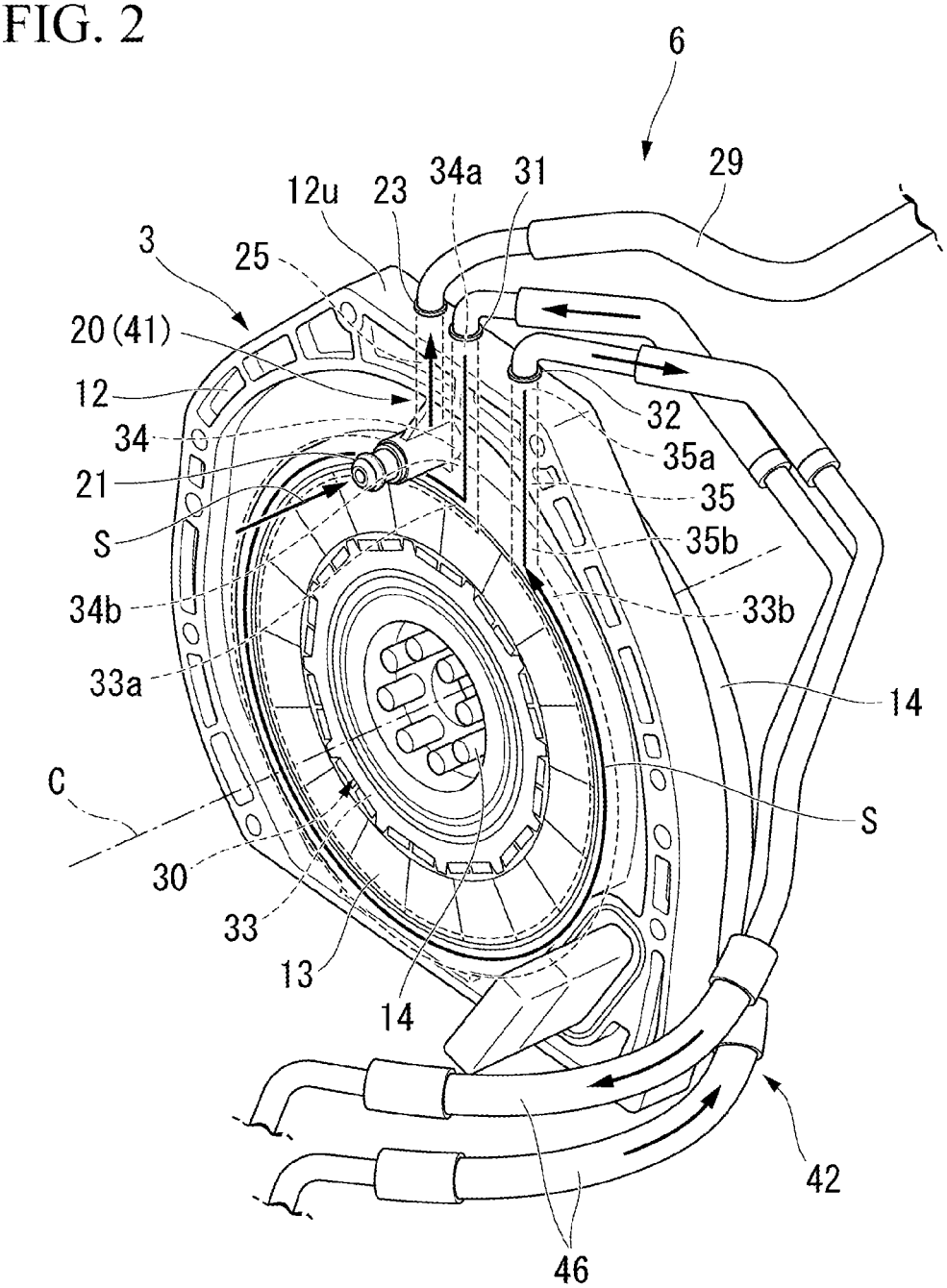
FIG. 2 is a perspective view of a motor according to the embodiment.

FIG. 2 is a perspective view of the motor 3 according to the embodiment as seen from a front.

The motor 3 is lined up behind the engine 2. As shown in FIG. 2, the motor 3 has a central axis C along the front-rear direction. The motor 3 has a motor case 12 (a casing of claims), a stator 13, and a rotor 14. The motor case 12 is formed in an annular shape. The stator 13 is formed in an annular shape centering on the central axis C along the front-rear direction. An outer peripheral portion of the stator 13 is fixed to the inner side of the motor case 12 via a stator holder (not shown). The rotor 14 is disposed inside the stator 13. The rotor 14 rotates about the central axis C with respect to the stator 13. The rotor 14 is connected to a crankshaft (not shown) of the engine 2 and a power transmission unit 4 to be described later.

As shown in FIG. 1, a power transmission unit 4 is disposed further behind the motor 3. The power transmission unit 4 is a transmission that is equipped with a clutch, a planetary gear, and the like, and switches the shift stage.

The electric device 5 is disposed in front of the engine 2. The electric device 5 is equipped with an inverter (not shown). The inverter connects the motor 3 to a power storage device (not shown) (for example, a battery or the like). The inverter converts direct current and three-phase alternating current between the motor 3 and the power storage device.

[Cooling Structure]

The cooling structure 6 cools the engine 2, the motor 3, the power transmission unit 4, and the electric device 5. Specifically, the cooling structure 6 has a first cooling circuit 41 that cools the engine 2 and the power transmission unit 4, and a second cooling circuit 42 that cools the motor 3 and the electric device 5. As the refrigerant S, for example, a long life coolant (LLC) is used.

[First Cooling Circuit]

The first cooling circuit 41 is disposed along a floor panel of the vehicle 1. The first cooling circuit 41 cools the engine 2 and the power transmission unit 4 by circulating the refrigerant S, such that it passes through the engine 2 and the power transmission unit 4. The first cooling circuit 41 has a first main flow path 45, a first motor internal flow path 20, and a first radiator 43.

The first main flow path 45 is disposed in a lower part of the vehicle 1. The first main flow path 45 connects the engine 2 and the power transmission unit 4 to the first radiator 43 disposed in a front part of the vehicle 1. Specifically, the first main flow path 45 allows the refrigerant S cooled by the first radiator 43 to flow to the engine 2. Further, the first main flow path 45 allows the refrigerant S, which is heated to a high temperature by exchanging heat with the engine 2 and the power transmission unit 4, to flow again to the first radiator 43. The first radiator 43 is made of a metal material such as aluminum. The first radiator 43 radiates the heat of the refrigerant S by air cooling, for example, when the outside air passes through a radiator core (not shown). The first main flow path 45 has a first drive pump 47 for allowing the refrigerant S to flow.

As shown in FIG. 2, the first motor internal flow path 20 is provided inside the motor case 12. The first motor internal flow path 20 supplies the refrigerant S discharged from the engine 2 to the power transmission unit 4. The first motor internal flow path 20 has a first inlet part 21, a first outlet part 23, and a communication passage 25.

The first inlet part 21 is provided on an end surface of the motor case 12 that faces the front. The first inlet part 21 is provided above an intermediate part of the motor case 12 in the vertical direction. The first inlet part 21 is open toward the engine 2 side. The refrigerant S discharged from the engine 2 after cooling the engine 2 flows into the first inlet part 21.

Figure 3:
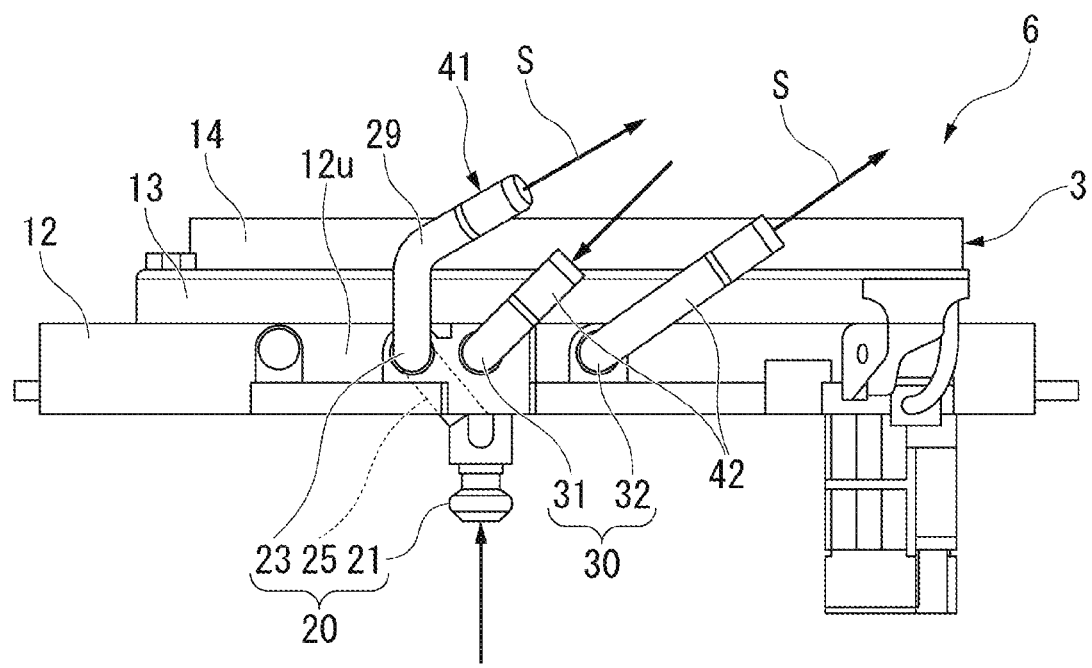
FIG. 3 is a top view of the motor according to the embodiment.

FIG. 3 is a top view of the motor 3 according to the embodiment.

The first outlet part 23 is provided on an upper surface 12u of the motor case 12. The first outlet part 23 is open toward the upper side of the motor case 12. A connecting pipe 29 is connected to the first outlet part 23. The refrigerant S discharged from the first outlet part 23 flows into the power transmission unit 4 (see FIG. 1) via the connecting pipe 29.

As shown in FIGS. 2 and 3, the communication passage 25 connects the first inlet part 21 and the first outlet part 23. The communication passage 25 is formed along the vertical direction. As a result, the refrigerant S flowing in from the first inlet part 21 flows through the communication passage 25, moves to the first outlet part 23, and is discharged from the first outlet part 23 to the outside of the motor 3.

[Second Cooling Circuit]

As shown in FIG. 1, the second cooling circuit 42 is disposed along a floor panel of the vehicle 1. The second cooling circuit 42 circulates the refrigerant S, while passing through the motor 3 and the electric device 5. As a result, the second cooling circuit 42 cools the motor 3 and the electric device 5. The second cooling circuit 42 has a second main flow path 46, a second motor internal flow path 30, and a second radiator 44.

The second main flow path 46 is disposed in the lower part of the vehicle 1. The second main flow path 46 connects the motor 3 and the electric device 5 to the second radiator 44 disposed in the front part of the vehicle 1. Specifically, the second main flow path 46 allows the refrigerant S cooled by the second radiator 44 to flow to the electric device 5, and allows the refrigerant S discharged from the electric device 5 to flow to the motor 3. Furthermore, the second main flow path 46 allows the refrigerant S, which is heated to a high temperature by exchanging heat with the motor 3, to flow again to the second radiator 44. The second radiator 44 is formed of a metal material such as aluminum. The second radiator 44 radiates the heat of the refrigerant S by air cooling, for example, when outside air passes through a radiator core (not shown). The second main flow path 46 has a second drive pump 48 for allowing the refrigerant S to flow.

Figure 4:
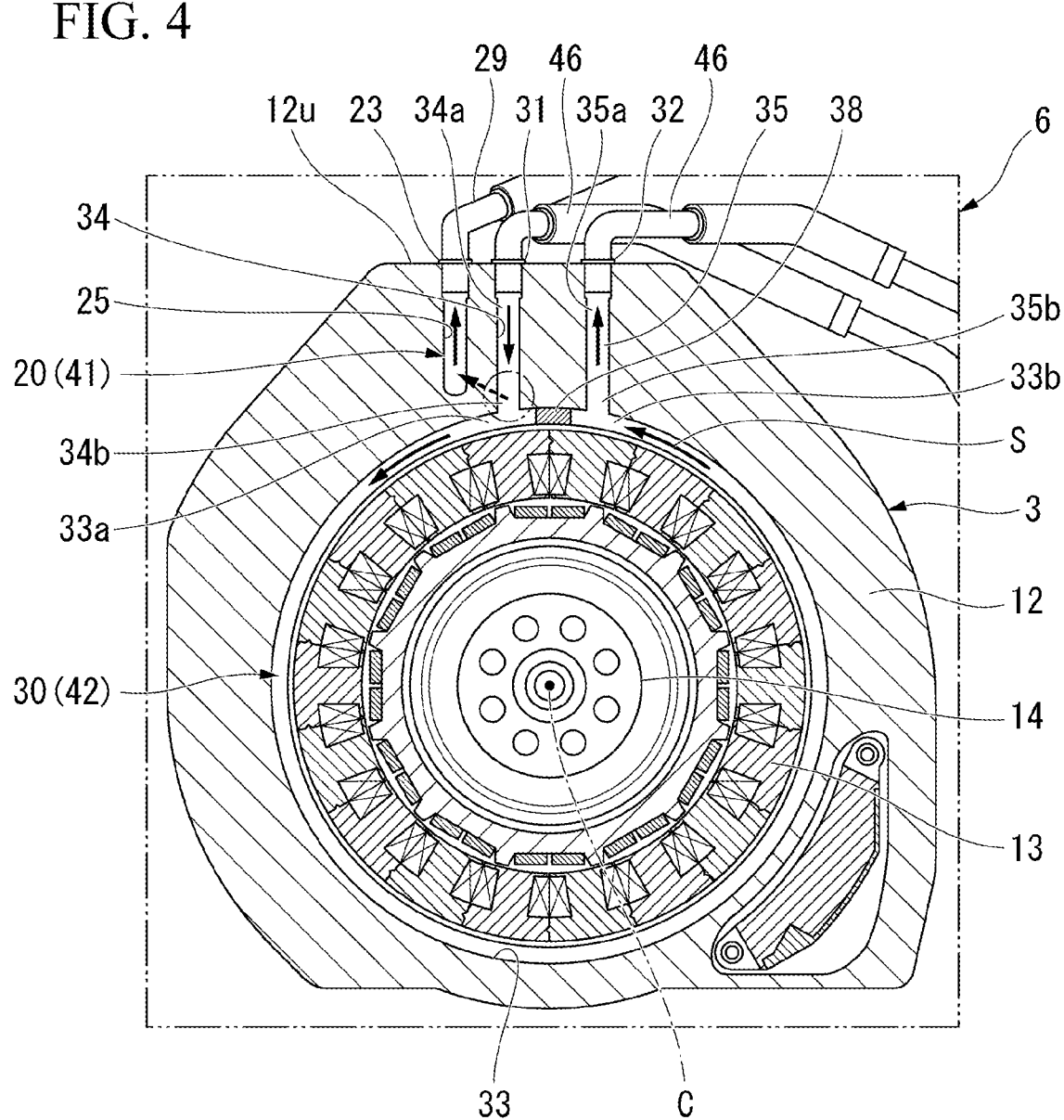
FIG. 4 is a cross-sectional view of the motor according to the embodiment.

FIG. 4 is a cross-sectional view of the motor 3 according to the embodiment.

The second motor internal flow path 30 is provided in the motor case 12. The second motor internal flow path 30 has a second inlet part 31 (an inlet part of the claims), an inlet pipe 34, a second outlet part 32 (an outlet part of the claims), an outlet pipe 35, and a circumferential flow path 33.

The second inlet part 31 is provided on the upper surface 12u of the motor case 12. The second inlet part 31 is open toward the upper side of the motor case 12. The refrigerant S discharged from the electric device 5 after cooling the electric device 5 flows into the second inlet part 31 through the second main flow path 46.

The inlet pipe 34 is formed in the motor case 12 along the vertical direction. The inlet pipe 34 is formed substantially parallel to the communication passage 25. One end 34a located above the inlet pipe 34 communicates with the second inlet part 31. The other end 34b of the inlet pipe 34 is located below the first inlet part 21 in the first motor internal flow path 20 and above the intermediate part of the motor case 12 in the vertical direction.

The second outlet part 32 is provided on the upper surface 12u of the motor case 12. The second outlet part 32 is open toward the upper side of the motor case 12. The second outlet part 32 is provided at a position farther from the first inlet part 23 than the second inlet part 31. The second main flow path 46 is connected to the second outlet part 32.

The outlet pipe 35 is formed inside the motor case 12 along the vertical direction. The outlet pipe 35 is formed substantially parallel to the inlet pipe 34. The outlet pipe 35 is provided at a position farther from the communication passage 25 than the inlet pipe 34. One end 35a located above the outlet pipe 35 communicates with the second outlet part 32. The other end 35b of the outlet pipe 35 is located at the same height as the other end 34b of the inlet pipe 34 in the vertical direction.

The circumferential flow path 33 is provided inside the motor case 12. The circumferential flow path 33 is provided below the inlet pipe 34 and the outlet pipe 35. The circumferential flow path 33 is formed in a substantially annular shape centering on the central axis C of the motor 3. The circumferential flow path 33 allows the refrigerant S to flow along the outer peripheral surface of the stator 13. The circumferential flow path 33 communicates with each of the inlet pipe 34 and the outlet pipe 35. Specifically, as viewed from the front, one end 33a of the circumferential flow path 33 is connected to the other end 34b of the inlet pipe 34. The circumferential flow path 33 extends counterclockwise in an annular shape from the other end 34b of the inlet pipe 34. The other end 33b of the circumferential flow path 33 is connected to the other end 35b of the outlet pipe 35. A separator 38 is provided in a portion of the circumferential flow path 33 located above and between the inlet pipe 34 and the outlet pipe 35. When viewed from the front, the separator 38 prevents the refrigerant S flowing into the circumferential flow path from the other end 34b of the inlet pipe 34 from flowing clockwise.

[Operation]

Next, the operation of the refrigerant S in the aforementioned cooling structure 6 will be described.

First, the operation of the refrigerant S flowing inside the first cooling circuit 41 will be described. As shown in FIG. 1, the refrigerant S cooled by the first radiator 43 first flows through the first main flow path 45 and flows into the engine 2 to cool the engine 2. Next, the refrigerant S heated to high temperature by cooling the engine 2 is discharged from the engine 2 and flows into the first motor internal flow path 20. As shown in FIG. 2, the refrigerant S flowing into the first motor internal flow path 20 sequentially flows through the first inlet part 21, the communication passage 25 and the first outlet part 23, and is discharged to the outside of the motor case 12. The refrigerant S discharged from the motor case 12 flows through the connecting pipe 29 and flows into the power transmission unit 4 (see FIG. 1) to cool the power transmission unit 4. After that, as shown in FIG. 1, the refrigerant S discharged from the power transmission unit 4 flows through the first main flow path 45 and moves to the first radiator 43 again.

As described above, the refrigerant S in the first cooling circuit 41 circulates in the order of the first radiator 43, the engine 2, the first motor internal flow path 20, the power transmission unit 4, and the first radiator 43, thereby cooling the engine 2 and the power transmission unit 4.

Next, the operation of the refrigerant S flowing inside the second cooling circuit 42 will be described. The refrigerant S cooled by the second radiator 44 first flows through the second main flow path 46 and flows into the electric device 5 to cool the electric device 5. Next, the refrigerant S discharged from the electric device 5 flows through the second main flow path 46, is transported to the motor case 12, and flows into the second motor internal flow path 30. The temperature of the refrigerant S flowing through the second motor internal flow path 30 is lower than the temperature of the refrigerant S flowing through the first motor internal flow path 20.

As shown in FIG. 4, the refrigerant S flowing into the second motor internal flow path 30 flows through the second inlet part 31 and the inlet pipe 34 and flows into the circumferential flow path 33. The second inlet part 31 and the inlet pipe 34 are provided to be close to the first motor internal flow path 20. The temperature of the refrigerant S flowing through the inlet pipe 34 is lower than the temperature of the refrigerant S flowing through the first motor internal flow path 20. The temperature of the refrigerant S flowing through the inlet pipe 34 rises, by receiving heat from the refrigerant S flowing through the first motor internal flow path 20. Specifically, the temperature of the refrigerant S rises within a range that does not affect the cooling of the motor 3. Next, the refrigerant S flowing from the inlet pipe 34 into the circumferential flow path 33 flows through the circumferential flow path 33 to cool the motor 3. The refrigerant S flows through the outlet pipe 35 and is discharged from the second outlet part 32 to the outside of the motor case 12. After that, the refrigerant S discharged from the motor case 12 flows through the second main flow path 46 and moves to the second radiator 44 (see FIG. 1) again.

In this way, the refrigerant S of the second cooling circuit 42 sequentially circulates through the second radiator 44, the electric device 5, the motor 3, and the second radiator 44, thereby cooling the electric device 5 and the motor 3.

Next, manufacturing of the motor 3 will be described.

When manufacturing the motor 3, in a state before the refrigerant S is injected into the second motor internal flow path 30, air exists inside the second motor internal flow path 30. In this state, the refrigerant is injected into the first cooling circuit 41 and the second cooling circuit 42. The engine 2 and the motor 3 are driven and simultaneously drive the first drive pump 47 and the second drive pump 48. As a result, the refrigerant S is filled in each of the first motor internal flow path 20 and the second motor internal flow path 30. At this time, in some cases, an air stagnation may occur in the circumferential flow path 33 of the second motor internal flow path 30 due to the retention of air bubbles.

The temperature of the refrigerant S flowing through the inlet pipe 34 gradually rises due to heat exchange with the first motor internal flow path 20 via the motor case 12. This reduces the viscosity of the refrigerant S and accelerates the flow velocity of the refrigerant S flowing into the circumferential flow path 33. When the refrigerant S in which the flow velocity is accelerated flows through the circumferential flow path 33, the refrigerant S pushes the air stagnation to the downstream side and discharges the air stagnation to the outside of the motor 3.

In this way, when the motor 3 is manufactured, the temperature of the refrigerant S in the second cooling circuit 42 rises and the flow velocity is accelerated, thereby discharging the air stagnation in the motor 3.

Action and Effect

Next, the action and effect of the cooling structure 6 will be described.

According to the cooling structure 6 of the vehicle 1 of the present embodiment, the first cooling circuit 41 cools the engine 2, and the second cooling circuit 42 cools the electric device 5 and the motor 3. The motor 3 can be cooled by the second cooling circuit 42 which is different from the first cooling circuit 41 for the engine 2 which easily reaches a high temperature. Therefore, it is possible to more efficiently cool the motor 3 than in a case in which the engine 2 and the motor 3 are cooled by a single cooling circuit.

The inlet pipe 34 of the second cooling circuit 42 is disposed on the first motor internal flow path 20 side of the first cooling circuit 41. As a result, heat exchange is performed between the inlet pipe 34 and the first motor internal flow path 20, and it is possible to increase the temperature of the refrigerant S flowing into the circumferential flow path 33 of the second cooling circuit 42. Here, for example, when the refrigerant S is injected into the second motor internal flow path 30 when manufacturing, air bubbles in the circumferential flow path 33 may remain as an air stagnation. With respect to this problem, according to the cooling structure 6 of the vehicle 1 of the present invention, the temperature of the refrigerant S flowing through the inlet pipe 34 rises due to the heat from the first motor internal flow path 20, and thus the viscosity decreases. As a result, it is possible to increase the flow velocity of the refrigerant S flowing into the circumferential flow path 33. Therefore, the air stagnation can be quickly discharged to the outside of the motor 3, without staying of the air bubbles. Since the temperature of the refrigerant S received in the inlet pipe 34 is lower than the temperature of the refrigerant S in the first cooling circuit 41, the cooling efficiency of the motor 3 does not significantly decrease. Therefore, the temperature can be increased within a range that does not affect the cooling efficiency of the motor 3, and the air stagnation can be discharged.

Therefore, it is possible to provide the cooling structure 6 of the vehicle 1 that suppresses the air stagnation in the motor 3 when manufacturing and improves the productivity, while maintaining the cooling efficiency of the motor 3.

In particular, when the inlet part of the second cooling circuit 42 is disposed to be closer to the first motor internal flow path 20 side than the outlet part, the flow velocity of the refrigerant S can be further increased and the air stagnation can be effectively discharged.

The outlet pipe 35 of the second motor internal flow path 30 is provided above the circumferential flow path 33. Therefore, the air bubbles that have risen due to the buoyancy in the circumferential flow path 33 can be easily guided to the outlet pipe 35. Therefore, the air stagnation in the motor 3 can be efficiently discharged.

Since the first cooling circuit 41 cools the engine 2 and the power transmission unit 4, it is possible to cool a plurality of components (the engine 2 and the power transmission unit 4) by the single first cooling circuit 41. The motor case 12 has a two-system cooling circuit of the first motor internal flow path 20 and the second motor internal flow path 30. Accordingly, even when the motor 3 is provided between the engine 2 and the power transmission unit 4, the first cooling circuit 41 can be bridged from the engine 2 to the power transmission unit 4 through the first motor internal flow path 20. Therefore, it is possible to efficiently cool the engine 2 and the power transmission unit 4.

The technical scope of the present invention is not limited to the above-described embodiments, and various modifications can be made without departing from the spirit of the present invention.

For example, in the above-described embodiment, there is a configuration in which the second inlet part 31 is provided to be closer to the first motor internal flow path 20 side than the second outlet part 32, and the inlet pipe 34 is disposed to be closer to the first motor internal flow path 20 side than the outlet pipe 35. However, the present invention is not limited thereto. For example, a configuration may be provided in which the second outlet part 32 is provided to be closer to the first motor internal flow path 20 side than the first inlet part 21, and the inlet pipe 34 and the outlet pipe 35 intersect in the motor case 12 so that the inlet pipe 34 is provided to be closer to the first motor internal flow path 20 side than the outlet pipe 35.

The first inlet part 21 may be provided, for example, on the upper surface 12u of the motor case 12. The first outlet part 23 may be provided, for example, on the end surface of the motor case 12 that faces the rear. Similarly, the second inlet part 31 and the second outlet part 32 may be provided on the end surface of one of the front or rear of the motor case 12.

The electric device 5 may include various electronic components other than the inverter.

The first cooling circuit 41 may cool other components in addition to the engine 2 and the power transmission unit 4. Similarly, the second cooling circuit 42 may cool other components in addition to the electric device 5 and the motor 3. That is, at least, the first cooling circuit 41 may cool the engine 2, the second cooling circuit 42 may cool the electric device 5 and the motor 3, and components other than those described above may be cooled within a range in which the temperature of the refrigerant S of the second cooling circuit 42 becomes lower than the temperature of the refrigerant S of the first cooling circuit 41.

In the above-described embodiment, the engine 2, the motor 3, and the power transmission unit 4 are disposed behind the passenger compartment of the vehicle 1. On the other hand, the engine 2, the motor 3, and the power transmission unit 4 may be disposed in front of the passenger compartment of the vehicle 1.

In addition, it is possible to appropriately replace the constituent elements in the above-described embodiments with well-known constituent elements without departing from the spirit of the present invention, and the above-described embodiments and modified examples may be appropriately combined.

EXPLANATION OF REFERENCES

1 Vehicle
2 Engine
3 Motor
4 Power transmission unit
5 Electric device
6 Cooling structure (cooling structure of vehicle)
12 Motor case (casing)
20 First motor internal flow path
30 Second motor internal flow path
31 Second inlet part (inlet part)
32 Second outlet part (outlet part)
33 Circumferential flow path
34 Inlet pipe
35 Outlet pipe
41 First cooling circuit
42 Second cooling circuit
S Refrigerant

What is claimed is:

1. A cooling structure of a vehicle comprising:
a first cooling circuit configured to cool an engine; and
a second cooling circuit configured to cool a motor and an electric device including an inverter which connects the motor and a power storage device,
wherein the first cooling circuit has a first motor internal flow path provided in a casing of the motor,
the second cooling circuit has a second motor internal flow path provided in the casing,
the second motor internal flow path has a circumferential flow path configured to allow a refrigerant to flow along a circumferential direction of the motor, an inlet pipe configured to allow the refrigerant to flow into the circumferential flow path, and an outlet pipe configured to discharge the refrigerant from the circumferential flow path, and the inlet pipe is disposed to be closer to the first motor internal flow path side than the outlet pipe.

2. A cooling structure of a vehicle comprising:

a first cooling circuit configured to cool an engine; and a second cooling circuit configured to cool a motor and an electric device including an inverter which connects the motor and a power storage device, wherein the first cooling circuit has a first motor internal flow path provided in a casing of the motor, the second cooling circuit has a second motor internal flow path provided in the casing, the second motor internal flow path has a circumferential flow path configured to allow a refrigerant to flow along a circumferential direction of the motor, an inlet part configured to allow the refrigerant to flow into the casing, and an outlet part configured to discharge the refrigerant from inside of the casing, and the inlet part is disposed to be closer to the first motor internal flow path side than the outlet part.

3. The cooling structure of the vehicle according to claim 1, wherein the second motor internal flow path has an outlet pipe configured to discharge the refrigerant from the circumferential flow path to the outside of the casing, and the outlet pipe is provided above the circumferential flow path.

4. The cooling structure of the vehicle according to any one of claim 1, wherein the vehicle has a power transmission unit, the first cooling circuit cools the power transmission unit, and the casing of the motor is provided between the engine and the power transmission unit.

* * * * *